United States Patent Office 3,510,453
Patented May 5, 1970

3,510,453
POLYMERIC COMPOSITION OF MATTER CONTAINING HYDROXYALKYL - SUBSTITUTED POLYALKYLENEPOLYAMINO IMIDES OF POLYHALOPOLYHYDROMETHANO - NAPHTHALENE DICARBOXYLIC ACIDS
Edward M. Geiser, Downers Grove, Ill., assignor to Universal Oil Products Company, Des Plaines, Ill., a corporation of Delaware
No Drawing. Continuation-in-part of application Ser. No. 405,611, Oct. 21, 1964. This application July 19, 1967, Ser. No. 654,374
Int. Cl. C08g 30/14
U.S. Cl. 260—47   16 Claims

ABSTRACT OF THE DISCLOSURE

Polymeric compositions of matter which are prepared by admixing a polymeric material with a hydroxyalkyl-substituted polyalkyleneamino imide of a polyhalopolyhydromethanonaphthalene dicarboxylic acid will possess desirable physical characteristics including fire retardancy and color stability.

---

This application is a continuation-in-part of my copending application Ser. No. 405,611, filed Oct. 21, 1964 now U.S. Patent No. 3,371,099.

This invention relates to polymeric composition of matter which comprises the product resulting from the admixture of certain polymeric material and a substituted imide of a polyhalopolyhydromethanonaphthalene dicarboxylic acid In past years, the use of certain polymeric compositions of matter such as plastics, resins, synthetic fabrics, etc. has experienced a tremendous growth. In view of the fact that plastics or resins are replacing metals in certain places involving an excessive amount of heat and possible exposure to flame, it is necessary that these synthetic compounds possess the capability of being able to withstand the aforementioned effects of heat and/or flame. For example, in recent years plastics have been used in architectural paneling, electrical appliances and equipment, and in other places where the possibility of contact with open flame is present. These plastics must therefore possess the physical properties of being resistant to flame or retardant to the action of the flame thereon. In addition to the use of these compounds in positions susceptible to flames, plastics have also been used as acoustical sound deadeners in walls or ceilings, as bodies for airplanes, automobiles, boats, as seats and for many other uses too numerous to mention at this time. Other polymeric compositions of matter such as resins which are used for coating other materials have also been more widely used in recent times. When such resins are used for coating other materials, it is necessary that the resins do not discolor or stain during a period of time due to the action of ultra-violet light thereon. This also holds true in the field of plastics. If the plastic material is either white or contains some color, it is especially necessary that it be color fast, otherwise it will deteriorate by changing color or by turning yellowish brown during long periods of use.

In this respect it has now been discovered that certain novel compositions of matter of a type hereinafter set forth in greater detail, when combined with certain polymeric compositions such as resins, plastics, foams, etc., will impart the desirable physical properties of flame retardancy, weather and color stability to said polymers. In addition to the aforementioned uses, it is also contemplated within the scope of this invention that the compounds prepared according to the process of this invention may also be utilized to impart insecticidal and shrink proofing properties to certain materials and specifically wool, although other naturally occurring fibrous materials such as cotton, linen, etc. may also be treated with these compounds to impart desirable and beneficial characteristics thereto.

It is therefore an object of this invention to provide polymeric compositions of matter which contains certain substituted imides of halo-substituted polyhydromethanonaphthalene dicarboxylic acids.

Another object of this invention is to provide polymeric compositions of matter which possess desirable physical properties, said properties being flame resistance, weather and color stability.

Yet another object of this invention is to provide a process for preparing the aforementioned polymeric compositions of matter.

In one aspect an embodiment of this invention resides in a polymeric composition of matter comprising the product resulting from the admixture of a polymeric material and a hydroxyalkyl-substituted polyalkylenepolyamino imide of a polyhalopolyhydromethanonaphthalene dicarboxylic acid.

Another embodiment resides in a process for the treatment of polymeric materials which comprises admixing a polymeric material with a hydroxyalkyl-substituted polyalkyleneamino imide of a polyhalopolyhydromethanonaphthalene dicarboxylic acid at an elevated temperature, treating the resultant mixture at an elevated temperature, and recovering the treated polymeric material.

A specific embodiment of this invention is found in a polymeric composition of matter resulting from the admixture of an epoxy resin having a plurality of 1,2-epoxy groups and N-[3-(2-hydroxyethyl)-7-methyl-3,6-diazatridecyl] - 5,6,7,8,9,9 - hexachloro-1,2,3,4,4a,5,8,8a-octahydro-5,8-methano-2,3-naphthalene dicarboxylic acid.

Other objects and embodiments will be found in the following further detailed description of this invention.

As hereinbefore set forth, the present invention relates to polymeric compositions of matter which contain, as one component thereof, a hydroxyalkyl-substituted polyalkylenepolyamino imide of polyhalopolyhydromethanonaphthalene dicarboxylic acid, and to a process for preparing these polymeric compositions of matter. The hydroxyalkyl-substituted polyalkylenepolyamino imides of polyhalopolyhydromethanonaphthalene dicarboxylic acids which are utilized in the present invention may be prepared in any suitable manner. Starting from the basic raw materials, the finished product may be prepared by a series of condensations. For example, a typical compound may be prepared by reacting a conjugated aliphatic diene with an olefinic dicarboxylic acid or anhydride thereof. Examples of conjugated aliphatic dienes which may be used include 1,3-butadiene, 2-methyl-1,3 - pentadiene, 1,3-pentadiene, etc.; olefinic dicarboxylic acids or anhydrides which may be used include maleic acid, maleic anhydride, fumaric acid, etc. The Diels-Alder condensation will take place at an elevated temperature in the range of from about 80° to about 250° C. or more and at a pressure sufficient to maintain a major portion of the reactants in a liquid phase, said pressure being in a range of from about atmospheric up to about 100 atmospheres or more. The tetrahydrophthalic acid or anhydride thereof which results from the aforementioned condensation is then further condensed with a conjugated halocycloalkadiene to form the desired product, examples of said halo-substituted cycloalkadienes including tetrachlorocyclopentadiene, hexachlorocyclopentadiene, tetrabromocyclohexadiene, hexabromocyclopentadiene, etc. The second condensation reaction is also effected at elevated temperatures in a range of from about 50° to about 250° C. or more at pressures ranging from atmospheric up to about 100 atmospheres or more, the pressure again being sufficient so as to maintain a major portion of the reactants in the liquid phase at the reaction temperature.

Examples of polyhalopolyhydromethanonaphthalene dicarboxylic acids or anhydrides thereof which may be prepared include 5,6,7,8,9,9-hexachloro-1,2,3,4,4a,5,8,8a-octahydro-5,8-methano-2,3-naphthalene dicarboxylic acid, 5,6,7,8,9,9-hexachloro - 1,2,3,4,4a,5,8,8a - octahydro-5,8-methano-2,3-naphthalene dicarboxylic anhydride, 5,6,7,8,-9,9-hexabromo-1,2,3,4,4a,5,8,8a - octahydro-5,8-methano-2,3-naphthalene dicarboxylic acid, 5,6,7,8,9,9-hexabromo-1,2,3,4,4a,5,8,8a-octahydro - 5,8-methano-2,3-naphthalene dicarboxylic anhydride, etc.

The thus prepared polyhalopolyhydromethanonaphthalene dicarboxylic acid or anhydride thereof is then reacted with a polyalkylenepolyamino compound such as diethylenetriamine, dipropylenetriamine, dibutylenetriamine, dipentylenetriamine, dihexylenetriamine, diheptylenetriamine, dioctylenetriamine, etc., triethylenetetramine, tripropylenetetramine, tributylenetetramine, tripentylenetetramine, trihexylenetetramine, triheptylenetetramine, trioctylenetetramine, etc., tetraethylenepentamine, tetrapropylenepentamine, tetrapentylenepentamine, tetrahexylenepentamine, tetraheptylenepentamine, etc., pentaethylenehexamine, pentapropylenehexamine, pentabutylenehexamine, pentapentylenehexamine, etc. The condensation process between the acid or anhydride and the polyalkylenepolyamino compound is effected at condensation conditions which include elevated temperatures in the range of from about 50° to about 250° C. or more. The particular reaction temperature will be dependent upon the reactants undergoing condensation, as well as the solvent comprising a substantially inert organic compound such as aromatic hydrocarbons including benzene, toluene, xylene, ethylbenzene, etc.; aliphatic solvents including n-pentane, n-hexane, n-heptane, etc.; or cyclic paraffins including cyclopentane, cyclohexane, methylcyclopentane, etc., which are used. In addition, the reaction time during which the starting materials undergo condensation will be dependent to some extent upon the particular temperature which is employed, usually the reflux temperature of the solvent, and will usually range from one-half to about five hours or more.

Following the preparation of the polyalkylenepolyamino imide of the polyhalopolyhydromethanonaphthalene dicarboxylic acid, the imide is then further condensed with a ketone. This condensation is also effected at temperatures ranging from room temperature (25° C.) up to about 200° C. or more and, if so desired, at pressures ranging from atmospheric up to about 50 atmospheres or more, the pressure which is used being sufficient to maintain a major portion of the reactants in a liquid phase. In addition, if so desired, this condensation is also effected in the presence of a substantially inert organic solvent of the type hereinbefore set forth in connection with the preparation of the imide. Examples of ketones which are condensed with the imide include acetone, methyl ethyl ketone, methyl propyl ketone, methyl butyl ketone, methyl pentyl ketone, methyl hexyl ketone, diethyl ketone, ethyl propyl ketone, ethyl butyl ketone, ethyl hexyl ketone, dipropyl ketone, etc.

The condensation product which is prepared according to the above paragraph is then reacted with an alkylene oxide to prepare the desired product. This reaction in which ethylene oxide or propylene oxide is condensed with the imide is effected at reaction conditions similar to those set forth in the above paragraph, that is, temperatures ranging from room temperature up to about 200° C. or more and pressures ranging from atmospheric up to about 50 atmospheres. The alkylene oxide is present in a mole ratio ranging from about 1:1 up to about 6:1 moles of alkylene oxide per mole of imide, the amount of oxide present being dependent upon the number of hydroxyalkyl substitutents which are desired to be placed on the polyalkylenepolyamino side chain of the imide.

Examples of hydroxyalkyl-substituted polyalkylenepolyamino imides of polyhalopolyhydromethanonaphthalene dicarboxylic acid which may be prepared according to the present invention possess the generic formula:

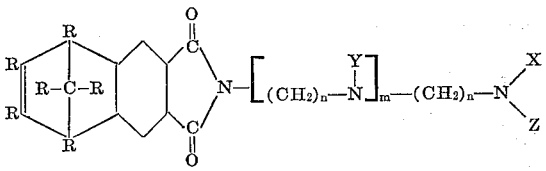

in which the R's are selected from the group consisting of hydrogen and halogen radicals, at least two R's being halogen; X and Z are selected from the group consisting of hydrogen, alkyl radicals containing from 1 to 8 carbon atoms and hydroxyalkyl radicals containing from 2 to 3 carbon atoms; Y is a hydroxyalkyl radical containing from 2 to 3 carbon atoms; $n$ is an integer of from 1 to 3; and $m$ is an integer of from 1 to 4. Specific examples of these compounds include N-[3-(2-hydroxyethyl)-7-methyl-3,6-diazatridecyl]-5,6,7,8,9,9-hexachloro-1,2,3,4,4a,5,8,8a-octahydro-5,8 methano-2,3-naphthalene dicarboxylic imide, N-[3,6-bis-(2-hydroxyethyl)-7-methyl-3,6-diazatridecyl]-5,6,7,8,9,9-hexachloro-1,2,3,4,4a,5,8,8a-octahydro-5,8-methano-2,3-naphthalene dicarboxylic imide, N-[4,8-bis-(2-hydroxyethyl)-9-methyl-4,8-diazaundecyl]-5,6,7,8,9,9-hexachloro-1,2,3,4,4a,5,8,8a-octahydro-5,8-methano-2,3-naphthalene dicarboxylic imide, N-[3,6,6-tris-(2-hydroxyethyl)-3,6-diazahexyl]-5,6,7,8,9,9-hexachloro-1,2,3,4,4a,5,8,8a-octahydro-5,8-methano-2,3-naphthalene dicarboxylic imide, N-[4,8-bis-(2-hydroxyethyl)-9-methyl-4,8-diazadodecyl]-5,6,7,8,9,9-hexabromo-1,2,3,4,4a,5,8,8a-octahydro-5,8-methano-2,3-naphthalene dicarboxylic imide, N-[3-(3-hydroxypropyl)-7-methyl-3,6-diazatridecyl]-5,6,7,8,9,9-hexachloro-1,2,3,4,4a,5,8,8a-octahydro-5,8-methano-2,3-naphthalene dicarboxylic imide, N-[3,6-bis-(3-hydroxypropyl)-7-methyl-3,6-diazatridecyl]-5,6,7,8,9,9-hexachloro-1,2,3,4,4a,5,8,8a-octahydro-5,8-methano-2,3-naphthalene dicarboxylic imide, N-[4,8-bis-(3-hydroxypropyl)-9-methyl-4,8-diazaundecyl]-5,6,7,8,9,9-hexachloro-1,2,3,4,4a,5,8,8a-octahydro-5,8-methano-2,3-naphthalene dicarboxylic imide, N-[3,6,6-tris-(3-hydroxypropyl)-3,6-diazahexyl]-5,6,7,8,9,9-hexachloro-1,2,3,4,4a,5,8,8a-octahydro-5,8-methano-2,3-naphthalene dicarboxylic imide, N-[4,8-bis-(3-hydroxypropyl)-9-methyl-4,8-diazadodecyl]-5,6,7,8,9,9-hexabromo-1,2,3,4,4a,5,8,8a-octahydro-5,8-methano-2,3-naphthalene dicarboxylic imide, etc.

It is to be understood that the aforementioned compounds are only representative of the novel compositions of matter which may be prepared and that the present invention is not necessarily limited thereto.

The aforementioned novel compositions of matter may be prepared in any suitable manner and may comprise either a batch or continuous type operation. For example, when utilizing a batch type operation and starting with the basic materials, the conjugated alkadiene and olefinic dicarboxylic acid are placed in an appropriate condensation apparatus which is thereafter heated to a temperature ranging from about 80° to about 250° C., while the pressures utilized will be in a range of from atmospheric up to about 100 atmospheres, said pressure being sufficient to maintain a major portion of the reactants in the liquid phase. At the end of the desired reaction time the tetrahydrophthalic acid, anhydride or homolog thereof which results from the aforementioned condensation is further condensed with a halo-substituted cycloalkadiene at elevated temperatures ranging from about 50° to about 250° C. in a second condensation vessel. If so desired, the two condensations may be effected in the presence of an organic solvent such as benzene, toluene, xylene, n-pentane, n-hexane, cyclopentane, etc. The third step in the preparation of the finished compound is effected by placing a polyalkylenepolyamino compound in a condensation vessel along with a substantially inert organic solvent. The compound resulting from the aforementioned condensation, namely, a polyhalopolyhydromethanonaphthalene dicarboxylic acid, is slowly added thereto, the reaction usually being exothermic. To control this exothermicity, the amino compound may be cooled prior to the addition of acid or anhydride and the rise in temperature controlled by utilization of any external cooling means such as ice baths. Upon completion of the addition of the acid or anhydride, the reaction mixture is heated to the reflux temperature of the solvent, if one is used, or to a predetermined reaction temperature which may be in the range of from about 100° up to about 250° C. or more. The reaction vessel which is utilized is provided with means for removing the water which is formed during the reaction. Upon completion of the desired residence time, which may range from about one-half up to about twelve hours or more, being evidenced by the removal of the theoretical amount of water, the reaction mixture is allowed to cool to room temperature. Following this, the desired imide is recovered from the solvent and excess amino compound by conventional means such as fractional distillation. In this respect it should be noted that the amino compound is usually present in the original reaction mixture in a ratio of from about 1:1 to 10:1 moles of amino compound per mole of acid or anhydride. The imide is then placed in yet another condensation apparatus and an aliphatic ketone of the type hereinbefore set forth is added thereto. As hereinbefore set forth, this condensation may also be effected in the presence of an organic solvent. Following this, the reaction mixture is heated to a temperature ranging from about room temperature up to about 200° C. or more. The resulting condensation product, after cooling of the reaction vessel, is recovered by fractional distillation and thereafter further condensed in a fifth condensation vessel with ethylene oxide or propylene oxide at reaction conditions similar to those set forth in the above step. At the end of the predetermined residence time, the vessel and contents thereof are cooled to room temperature and the desired hydroxyalkyl-substituted polyalkylenepolyamino imide of a polyhalopolyhydromethanonaphthalene dicarboxylic acid is separated from the solvent and any unreacted starting materials by conventional means such as fractional distillation.

It is also contemplated that the novel products of the present invention may also be prepared in a continuous manner. When such type of operation is used, a quantity of the starting materials comprising the conjugated aliphatic diene such as 1,3-butadiene and the olefinic dicarboxylic acid such as maleic acid are continuously charged to a reaction vessel which is maintained at the proper operating conditions of temperature and pressure. These starting materials may be charged through separate lines or, if so desired, may be mixed with an organic solvent prior to entering into said reactor and charged thereto in a single stream. Upon completion of the desired reaction time, the condensation product is continuously withdrawn from the reactor and separated from unreacted materials, the latter being recycled to form a portion of the feed stock, while the former comprising a tetrahydrophthalic acid, anhydride or homolog thereof is charged to a second reactor. This second reactor is also maintained at the proper operating conditions of temperature and pressure and will contain a substantially inert organic solvent. The halosubstituted cycloalkadiene such as hexachlorocyclopentadiene is also continuously charged to the second reactor. Upon completion of the desired residence time therein, the polyhalopolyhydromethanonaphthalene dicarboxylic acid or anhydride thereof is continuously withdrawn and subjected to separation treatment similar to that which takes place after withdrawal of the condensation product from the first reactor; that is, it is separated from unreacted starting materials which are recycled back to the second reactor. The acid or anhydride thereof is then continuously charged to a third reactor which, as in the case of all reaction zones of the continuous process, is maintained at the proper operating conditions of temperature and pressure. In addition, an excess of polyalkylenepolyamino compound along with a substantially inert organic solvent is also continuously charged to the third reactor zone through a separate line. The reactor effluent is continuously removed from this third reaction zone and the unreacted starting materials are separated therefrom, after which the remainder of the effluent is subjected to further treatment to remove the organic solvent and water which has formed during the reaction. The desired imide is then charged to a fourth reaction zone along with an aliphatic ketone wherein the imide undergoes condensation with the ketone. As in the case of the previous reaction zones, the reactor effluent is also continuously withdrawn and subjected to a separation treatment wherein the unreacted starting materials and solvent, if one is used, are removed and recycled, while the condensation product is continuously charged to a fifth reaction zone. In this reaction zone the imide undergoes reaction with ethylene oxide or propylene oxide, the amount of the oxide present being determined by the number of hydroxyalkyl radicals which are desired to be substituted on the side chain of the imide. The desired hydroxyalkyl-substituted polyalkylenepolyamino imide of a polyhalopolyhydromethanonaphthalene dicarboxylic acid is separated from the reactor effluent by conventional means and recovered.

As hereinbefore set forth the hydroxyalkyl-substituted polyalkylenepolyamino imide of polyhalopolyhydromethanonaphthalene dicarboxylic acid is utilized as a component of plastics, resins, foams, etc. to impart certain desirable characteristics on properties thereto. For example, a specific use of these imides are as an additive for resinous materials. Particularly speaking, the products of this invention may be used as additives with epoxy resins whereby the final product will possess advantageous physical properties, among which are a high degree of flame retardancy and improved weather stability, as well as improved light or color stability. The epoxy resins in an uncured stage are usually thermoplastic and may range from low viscosity liquids to high melting point, brittle solids. One example of an epoxy resin which may be cured by the addition of the imides of the present invention is the condensation product of epichlorohydrin and bisphenol-A. The resins may be cured by admixng a hydroxyalkyl-substituted imide of the type hereinbefore set forth with the resin and thereafter curing the mixture by treatment at an elevated temperature for a predetermined period of time. The resultant product will have the physical characteristics thereof altered to their desirable value and thus may be utilized for various purposes such as floor surfacing, coatings, etc.

Other polymeric materials which may be admixed with the hydroxyalkyl - substituted polyalkylenepolyamino imides of polyhalopolyhydromethanonaphthalene dicarboxylic acids to form desired polymeric compositions of matter include polyurethanes which are prepared from prepolymers in which the reactive functional group is a isocyano end group. The particular prepolymer to be treated with the imide will be prepared by reacting a polyester with an excess of an isocyanate such as tolylene diisocyanate, polymethylene polyphenyl isocyanate, diphenylmethane 4,4-diisocyanate, p,p-diphenylmethane diisocyanate, etc. The resulting prepolymer will be a linear low molecular weight product. The prepolymer is then cured by reaction with a hydroxyalkyl-substituted polyalkyleneamino imide of a polyhalopolyhydromethanonaphthalene dicarboxylic acid to form the desired product. The curing of the prepolymer by the addition of the imide results in the cross-linking or chain extension of the polymer to give higher molecular weight compounds. These compounds may be prepared in foam form by incorporating a foaming agent such as water, alcohol, etc. during the curing step. This final product will then possess the desired physical properties of the type hereinbefore set forth, that is, a high stability as regards color changes due to deterioration. In addition to being used as a foam, the urethanes may be used as coatings, said coatings having desirable characteristics such characteristics including being fast drying, possessing a hard surface, a deep gloss, a high resistance to abrasion and weathering as well as an excellent resistance to fire. When utilizing these urethanes as coatings of this type, it is necessary in many instances that the coating also have a high resistance to changes in color especially when being exposed to climatic conditions of sun, heat, cold, etc. By utilizing a hydroxyalkyl-substituted polyalkylenepolyamino imide of polyhalopolyhydromethanonaphthalene dicarboxylic acid the coating will possess fire retardancy as well as the necessary physical characteristics and will retain the required color for a longer period of time than will polyurethane coating which does not contain this particular component.

Yet another example of prepolymers containing an excess of at least one reactive functional group which may be reacted with the hydroxyalkyl-substituted polyalkylenepolyamino imides of polyhalopolyhydromethanonaphthalene dicarboxylic acids comprises polyamides. These polyamides may be prepared by condensing a polyamine with a dibasic acid. Examples of these polyamides would be the condensation of an amine containing more than two functional groups such as diethylenetriamine, dipropylenetriamine, etc., or with a molar excess of a diamine such as ethylenediamine, propylenediamine, etc., with a dibasic acid such as adipic acid, sebacic acid, etc. to form a prepolymer, said prepolymer containing a reactive functional amine group which may then be cross-linked with a hydroxysubstituted polyalkyleneamino imide of a polyhalopolyhydromethanonaphthalene dicarboxylic acid. This cross-linking may be done at temperatures ranging from about 200° up to about 300° C. or more. The resulting cured or cross-linked polyamide may then be used for molding resins, films, coatings, insulation, etc., the finished product again exhibiting the desired physical properties of being flame resistant and also being resistant to color changes due to the stability of the hydroxyl-substituted polyalkylenepolyamino imides of polyhalopolyhydromethanonaphthalene dicarboxylic acid thereof which is utilized in the preparation.

Another example of a polymer or prepolymer which may be cured or cross-linked by use of the aforementioned acid or anhydride thereof are polyesters. These polyesters are prepared by reacting a poly basic acid with an excess of a polyol or a polyamine at condensation conditions. The resulting ester may then be cured or cross-linked with a hydroxyalkyl-substituted polyalkylenepolyamino imide of polyhalopolyhydromethanononaphthalene dicarboxylic acid to form the desired products. The polybasic acids, and preferably dibasic acids which are used will be either saturated or unsaturated in nature. Example of saturated dibasic acids which may be used include oxalic acid, malonic acid, succinic acid, glutonic acid, adipic acid, pimelic acid, suberic acid, azelaic acid, sebacic acid, brassic acid, brazilic acid, riccellic acid, etc.; unsaturated dibasic acids include fumaric acid, maleic acid, the isomeric $C_5$ acids such as glutaconic, citraconic, itaconic acid, ethidenemalonic acid, mesaconic acid, the isomeric $C_6$ acids including allylmalonic propylidenemalonic acid, hydromalonic acid, succinic acid, glutonic acid, adipic acid, such as allylsuccinic acid, carbocaprolactonic acid, tereconic acid, the $C_8$ acids such as xeronic acid, the $C_{19}$ acids such as cetylmalonic acid, etc. In addition, it is also contemplated that dibasic aromatic acids such as terphthalic and isophthalic acids may also be used. Examples of polyols which may be used include ethylene glycol, diethylene glycol, 1,2,6-hexanetriol, 1,3,6-hexanetriol, phenyl glycol, 1,4-cyclohexanediol, 1,4-dihydroxymethylcyclohexane, etc. Examples of polyamines which may be used include ethylenediamine, diethylenetriamine, triethyltetramine, propylenediamine, dipropyltriamine, tripropyltetramine, pentylenediamine, dipentyltriamine, N-methyldiaminoethane, N-ethyldiaminoethane, N-methyl-1, 3-daminopropane, N-alkyl-1,3-diaminopropanes in which the alkyl group contains from about 8 to about 25 carbon atoms of which a number of the class are commercially available such as "Duomeen-T" and "Diam 26" in which the alkyl group is derived from tallow and contains from about 12 to about 20 carbon atoms per group and preferably about 16 to 18 carbon atoms per group; o-phenylenediamine, m-phenylenediamine, p-phenylenediamine, the isomeric diamine, naphthylenediamines, 1,2,4-trialkylbenzene, 1,3,5-trialkylbenzene, diaminodiphenylamine, diaminodinaphthylamine, diaminocyclohexane, diaminocycloheptanes, etc.

It is to be understood that the aforementioned dibasic acids, polyols and polyamine compounds are only representatives of the class of compounds which may be used to form polyesters which are thereafter cured or cross-linked with the hydroxyalkyl-substituted polyalkylenepolyamino imides of polyhalopolyhydromethanonaphthalene dicarboxylic acids of the type hereinbefore set forth, and that the present invention is not necessarily limited thereto. The resins which result from the curing or cross-linking will possess both flame-retardant and color-stable properties. The resins may be in the form of alkyds and may be used as coatings or the cross-linked polyesters may be used for molding and casting polymers which also possess the aforementioned desired physical characteristics.

The aforementioned polymeric materials, which contain an excess of at least one reactive functional group and the hydroxylalkyl-substituted polyalkylenepolyamino imides of polyhalopolyhydromethanonaphthalene dicarboxylic acid may be reacted in any manner known in the art, the reactive conditions such as temperature and pressure being dependant upon the particular compounds undergoing curing or cross-linking usually speaking, the treatment of the polymeric material and the imide will be effected at temperatures ranging from room temperature (about 25° C.) up to about 300° C. or more and preferably in a range of from about 100° to about 300° C. In addition, the imide will be present in the finished reaction product which comprises the polymeric composition of matter in various concentrations ranging from about 5% to about 50% or more by weight of the finished product, the particular concentration again being dependant upon the particular use to which finish polymeric composition of matter will be put.

The following examples are given to illustrate the process of the present invention which, however, are not intended to limit the same broad scope of the present invention in strict accordance therewith.

EXAMPLE I

A glass liner containing a mixture of 0.5 mole of maleic acid and an organic solvent comprising toluene is sealed into an autoclave and about 1 mole of 1,3-butadiene is pressured in. The autoclave and contents thereof are heated to a temperature of about 175° C. and maintained at this temperature for a period of about 3 hours, at the end of which time the autoclave and contents thereof are cooled to rooms temperature. The desired product is separated by extracting the reaction product with dilute alkali, followed by acidification and fractional crystallization. The fraction comprising 1,2,3,6-tetrahydrophthalic acid is separated, placed in a flask and mixed with a molecular proportion of hexachlorocyclopentadiene and xylene solvent. The mixture is heated to a temperature of about 150° C. and maintained thereat for an additional period of about 2 hours. At the end of this time the flask and contents thereof are then allowed to cool to room temperature, and the product is subjected to fractional crystallization. The desired product, comprising 5,6,7,8,9,9-hexachloro-1,2,3,4,4a,5,8,8a-octahydro-5,8-methane - 2,3 - naphthalene dicarboxylic acid is separated and recovered.

Following this, about 2.5 moles of diethylenetriamine is placed in a reaction vessel provided with a water trap. There is gradually added thereto about 0.5 mole of the acid prepared according to the above paragraph during a period of about 1 hour. Benzene is then added; the reaction mixture is heated and maintained at reflux temperature (about 85° C.) for a period of about 1.5 hours during which time the water which forms is removed. The benzene is then removed by distillation in a steam bath and the excess diethylenetriamine is removed by distillation under high vacuum. The resultant product, which is solid, is ground to a fine product, washed with water, dissolved in methyl alcohol and dried using anhydrous sodium sulfate. The mixture is then filtered and the methyl alcohol is evaporated to yield the desired product comprising the diethylenediamino imide of 5,6,7,8,9,9-hexachloro - 1,2,3,4,4a,5,8,8a - octahydro-5,8-methano-2,3-naphthalene dicarboxylic acid.

The imide prepared according to the above paragraph is then placed in a condensation flask provided with heating and refluxing means. A molecular proportion of methyl hexyl ketone along with a substantial amount of benzene is added thereto. The resultant solution is then heated and refluxed at a temperature of about 85° C. for a period of about 3 hours. At the end of this time the solvent is removed by distillation in a steam bath; the product is washed with water and dried again using anhydrous sodium sulfate to yield the N-(7-methyl-3,6-diazatridecyl) imide of 5,6,7,8,9,9-hexachloro-1,2,3,4,4a,5,8,8a-octahydro-5,8-methano-2,3-naphthalene dicarboxylic acid.

The imide which is prepared according to the above paragraph and ethylene oxide in equimolecular proportions along with benzene are placed in a condensation flask and the resultant solution is refluxed for a period of about 2 hours. At the end of this time the flask and contents thereof are allowed to cool to room temperature, and the benzene is removed by distillation in a steam bath. The product is then washed with water, dissolved in alcohol and dried. Upon removal of the alcohol by evaporation, the desired product comprising N-[3-(2-hydroxyethyl) - 7 - methyl - 3,6 - diazatridecyl]-5,6,7,8,9,9-hexachloro - 1,2,3,4,4a,5,8,8a-octahydro - 5,8-methano-2,3-naphthalene dicarboxylic imide is recovered.

The hydroxyethyl-substituted imide prepared according to the above is utilized as a curing agent for a liquid epoxy resin having an epoxide equivalent weight of 190 and known in the trade as "Epon 828." A mixture of the imide and the epoxy resin is warmed on a steam bath. After several minutes the mixture will become homogenous and is poured into molds which have been prepared from glass sheets and Teflon spacers. In addition, a mold release agent is also used to facilitate removal. The molds are placed in an air circulating oven and the curing of the resin will be effected by maintaining the molds at a temperature of about 100° C. for a period of about 6 hours. The epoxy resin which has been cured by the addition of the imide will be found to be self-extinguishing when removed from the direct action of the flame. In addition, the resin will also possess a good color stability when placed in direct sunlight for an extended period of time.

EXAMPLE II

In this example the N-(7-methyl-3,6-diazatridecyl)-5,6,7,8,9,9-hexachloro - 1,2,3,4,4a,5,8,8a - octahydro-5,8-methano-2,3-naphthalene dicarboxylic imide is prepared in a manner set forth in the above example. Following the preparation of the imide, one molecular proportion of said imide and two molecular proportions of ethylene oxide along with xylene are placed in a condensation apparatus. The apparatus is heated to a temperature of about 150° C. and maintained at the reflux temperature for a period of about 3 hours. At the end of this time the reaction product is recovered, the solvent is removed by distillation and the product is washed with water. After several washes with water, the product is dissolved in alcohol and dried using anhydrous sodium sulfate. The alcohol is evaporated and the desired product comprising N-[3,6-bis-(2-hydroxyethyl)-7-methyl - 3,6 - diazatridecyl]-5,6,7,8,9,9-hexachloro - 1,2,3,4,4a,5,8,8a - octahydro-5,8-methano-2,3-naphthalene dicarboxylic imide is recovered.

The product prepared according to the above paragraph is used to cure an epoxy resin in a manner similar to that set forth in Example I above, that is by admixing said imide with an epoxy resin known as "Epon 828" and heating the mixture. The solution is then poured into molds similar in nature to those hereinbefore set forth and cured in an air circulated oven at a temperature of about 100° C. for a period of 6 hours. The recovered treated resin will have excellent heat distortion and hardness properties, as well as being self-extinguishing when removed from the direct action of a flame, and will possess excellent color stable properties.

EXAMPLE III

In this example the desired imide is prepared in a manner similar to that set forth in Example I above by condensing 5,6,7,8,9,9 - hexachloro - 1,2,3,4,4a,5,8,8a-octahydro-5,8-methano-2,3-naphthalene dicarboxylic acid with an excess of dipropylenetriamine. Upon completion of the condensation, the excess dipropylenetriamine, water and solvent are removed and the resultant N-dipropylenediamino imide of 5,6,7,8,9,9-hexachloro-1,2,3,4,4a,5,8,8a-octahydro-5,8-methano-2,3-naphthalene dicarboxylic acid is recovered. This imide is then condensed with a molecular proportion of methyl ethyl ketone in a manner similar to that hereinbefore set forth and the resulting adduct is condensed with ethylene oxide in equimolecular proportions. After treatment of the reaction product in a manner hereinbefore set forth, the resultant product comprising N-[4,8-bis-(2-hydroxyethyl) - 9 - methyl - 4,8 - diazaundecyl]-5,6,7,8,9,9-hexachloro - 1,2,3,4,4a,5,8,8a - octahydro - 5,8 - methano-2,3-naphthalene dicarboxylic imide is separated and recovered.

This product is admixed with an uncured epoxy resin of the type hereinbefore set forth in Example I above and, after heating to dissolve the imide, the mixture is poured into molds. The treated resin is cured by heating to 100° C. for a period of 6 hours in an air circulating oven. Upon recovery of the treated resin, it will be found to possess heat distortion, hardness, flame retardancy and color stable properties similar to those resins described in Examples I and II above.

EXAMPLE IV

In this example the imide comprising N-(7-methyl-3,6-diazatridecyl) - 5,6,7,8,9,9 - hexachloro-1,2,3,4,4a,5,8,8a-octahydro-5,8-methano-2,3naphthalene dicarboxylic imide is prepared according to the method set forth in Example I above. One molecular proportion of this imide and three molecular proportions of ethylene oxide are refluxed in benzene at a temperature of about 85° C. for a period of 3 hours. At the end of this time the solvent is then evaporated and the product treated by washing with water dissolution in methyl alcohol and drying. The alcohol is then evaporated and the desired product comprising N-[3,6,6-tris-(2 - hydroxyethyl)-3,6-diazahexyl]-5,6,7,8,9,9-hexachloro - 1,2,3,4,4a,5,8,8a - octahydro-5,8-methano-2,3-naphthalene dicarboxylic imide is recovered.

An epoxy resin known in the trade as "Epon 828" and the imide prepared according to the above paragraph are warmed on a steam bath. When the mixture becomes homogenous, it is poured into molds similar in nature to those described in Example I above. The mixture is placed in an air circulating oven at a temperature of about 100° C. for a period of 6 hours. At the end of this time the sheets of resin which have been cured are cut into strips and subjected to physical property evaluations. The physical properties of this resin are similar in nature to those found in the above examples as to heat distortion and hardness; in addition, the strip of resin is self-extinguishing when removed from the direct action of a flame.

EXAMPLE V

In this example 1,2,3,6-tetrahydrophthalic acid is prepared by placing 0.5 mole of maleic acid and toluene in a glass liner of a rotating autoclave, which is thereafter sealed into the autoclave. About one mole of 1,3-butadiene is pressured into the autoclave which is thereafter heated to a temperature of about 185° C. The autoclave and contents thereof are maintained at this temperature for a period of about 3 hours, following which the autoclave is allowed to cool to room temperature. The desired product is recovered by extracting the reaction product with dilute alkali followed by acidification and fractional distillation.

Following this, the acid is mixed with a molecular proportion of hexabromocyclopentadiene and xylene solvent. The mixture is heated to reflux (about 150° C.) and maintained thereat for an additional period of 2 hours. At the end of this time the flask and contents thereof are allowed to cool to room temperature and the product subjected to fractional crystallization. The desired reaction product comprising 5,6,7,8,9,9-hexabromo-1,2,3,4,4a,5,8,8a-octahydro - 5,8 - methano-2,3-naphthalene dicarboxylic acid is separated and recovered. The acid prepared in this manner is then condensed with dipropylenetriamine in a manner similar to that set forth above and the desired product comprising the dipropylenediamino imide of 5,6,7,8,9,9-hexabromo-1,2,3,4,4a,5,8,8a-octahydro-5,8-methano-2,3-naphthalene dicarboxylic acid is recovered. This imide is then further condensed with methyl propyl ketone in a manner described in Example I above and the desired N-(9-methyl-4,8-diazadodecyl)-5,6,7,8,9,9-hexabromo - 1,2,3,4,4a,5,8,8a - octahydro-5,8-methano-2,3-naphthalene dicarboxylic imide is recovered. A molecular proportion of this imide is treated with two molecular proportions of ethylene oxide and a benzene solvent in a manner similar to that set forth in Example I above. After treatment of the reaction product by washing, drying and evaporation of the solvent, the desired product comprising N-[4,8-bis-(2-hydroxyethyl)-9-methyl-4,8-diazadodecyl]-5,6,7,8,9,9-hexabromo - 1,2,3,4,4a,5,-8,8a-octahydro-5,8-methano-2,3-naphthalene dicarboxylic imide is recovered.

The imide prepared according to the above paragraph is used to treat an epoxy resin known in the trade as "Epon 828." The mixture of the imide and resin, after warming, will become homogenous and is poured into molds made of glass using Teflon spacers. The mixture is cured in an air circulating oven at a temperature of 100° C. for a period of 6 hours. The cured sheets are removed and subjected to physical property evaluation. It is found that the physical properties of the resin are similar in nature as regards heat distortion, hardness, flame retardancy resins of Examples I to IV above.

EXAMPLE VI

In this example a polyester is prepared by reacting 146 g. (1.0 mole) of adipic acid and 106 g. (1.0 mole) of diethylene glycol with heating for a predetermined period of time at a temperature of about 150° C. The polyester is then cured by treating with 1.0 mole of N-[3-(2-hydroxyethyl)-7-methyl - 3,6 - diazatridecyl] - 5,6,7,8,9,9-hexachloro-1,2,3,4,4a,5,8,8a - octahydro - 5,8 - methano-2,3-naphthalene dicarboxylic acid at a temperature of about 150° C. to form the desired product. This product possesses excellent color stability, said product retaining the original color for a relatively long period of time as compared to other polyesters which do not contain the imide. In addition, the product will exhibit excellent fire retardant properties.

EXAMPLE VII

In this example a polymer material is prepared by condensing 103 g. (1.0 mole) of diethylenetriamine with 146 g. (1.0 mole) of adipic acid to form a polymeric material which is then treated with 1.0 mole of N-[3,6-bis-(2-hydroxyethyl) - 7 - methyl-3,6-diazatridecyl]-5,6,7,8,9,9-hexachloro-1,2,3,4,4a,5,8,8a-octahydro - 5,8 - methano-2,3-naphthalene dicarboxylic acid at a temperature of about 150° C. for a predetermined time to form a polymeric composition of matter which, as in the case of the above examples, will possess an excellent color stability in flame retardancy.

EXAMPLE VIII

In this example a urethane foam is prepared by reacting 53 g. (0.5 mole) of diethylene glycol, 73 g. (0.5 mole) of adipic acid and 67 g. (0.5 mole) of 1,2,6-hexanetriol in a 3-neck alkylation flask which is provided with a stirrer, a nitrogen inlet tube, a short column for water take-off and a condenser. The mixture is then placed under a nitrogen blanket and heated to a temperature in the range of about 155° to about 175° C. for a period of about 3.5 hours. At the end of this time the product which formed is removed and thoroughly admixed with an excess of 2,4-tolylene diisocyanate. The resulting urethane polymer is than cured by treatment with N-[3,6,6-tris-(2-hydroxyethyl) - 3,6 - diazahexyl]-5,6,7,8,9,9-hexachloro-1,2,3,4,4a,5,8,8a - octahydro-5,8-methano-2,3-naphthalene dicarboxylic acid to provide a polyurethane foam which possesses excellent color stability and flame retardant properties.

I claim as my invention:
1. A curable composition comprising
   (a) A polyfunctional polymeric material whose functionality is at least partially due to the presence of 1,2-epoxy groups, hydroxyl groups, isocyano groups or amine groups, and
   (b) A hydroxy substituted polyalkylenepolyamino imide of a polyhalopolyhydromethanonaphthalene dicarboxylic acid.
2. Curable composition set forth in claim 1, further characterized in that said polymeric material is an epoxy resin having a plurality of 1,2-epoxy groups.
3. Curable composition set forth in claim 1, further characterized in that said polymeric material is a polyurethane.
4. Curable composition set forth in claim 1 further characterized in that said polymeric material is a polyester resin.
5. Curable composition set forth in claim 1 further characterized in that said imide is N-[3-(2-hydroxyethyl)-7 - methyl - 3,6 - diazatridecyl]-5,6,7,8,9,9-hexachloro-1,2,3,4,4a,5,8,8a - octahydro - 5,8 - methano - 2,3-naphthalene dicarboxylic acid.
6. Curable composition set forth in claim 1, further characterized in that said imide is N-[3,6-bis-(2-hydroxyethyl)-7-methyl - 3,6 - diazatridecyl] - 5,6,7,8,9,9-hexachloro - 1,2,3,4,4a,5,8,8a - octahydro - 5,8 - methano - 2,3-naphthalene dicarboxylic acid.
7. Curable composition set forth in claim 1, further characterized in that said imide is N-[4,8-bis-(2-hydroxyethyl) - 9 - methyl - 4,8 - diazaundecyl] - 5,6,7,8,9,9-hexachloro - 1,2,3,4,4a,5,8,8a - octahydro - 5,8 - methano-2,3-naphthalene dicarboxylic acid.
8. Curable composition set forth in claim 1, further characterized in that said imide is N-[3,6,6,-tris-(2-hydroxyethyl) - 3,6 - diazahexyl] - 5,6,7,8,9,9-hexachloro-1,2,3,4,4a,5,8,8a - octahydro - 5,8 - methano-2,3-naphthalene dicarboxylic acid.

9. Curable composition set forth in claim 1, further characterized in that said imide is N-[4,8-bis-(2-hydroxyethyl) - 9 - methyl - 4,8 - diazadodecyl] - 5,6,7,8,9,9-hexachloro - 1,2,3,4,4a,5,8,8a - octahydro - 5,8 - methano-2,3-naphthalene dicarboxylic acid.

10. A process for crosslinking a polyfunctional polymeric material whose functionality is at least partially due to the presence of 1,2-epoxy groups, hydroxyl groups, isocyano groups or amine groups which comprises admixing said polymeric material with a curing amount of a hydroxy substituted polyalkylenepolyamino imide of a polyhalopolyhydromethanonaphthalene dicarboxylic acid and heating said admixture under conditions of temperature and time sufficient to crosslink said admixture.

11. The process as set forth in claim 10, further characterized in that said polyfunctional polymeric material is an epoxy resin having a plurality of 1,2-epoxy groups.

12. The process as set forth in claim 10, further characterized in that said polyfunctional polymeric material is a polyurethane.

13. The process as set forth in claim 10, further characterized in that said polyfunctional polymeric material is a polyester resin.

14. The process as set forth in claim 10, further characterized in that said imide comprises N-[3-(2-hydroxyethyl) - 7 - methyl - 3,6 - diazatridecyl] - 5,6,7,8,9,9-hexachloro - 1,2,3,4a,5,8,8a - octahydro - 5,8 - methano - 2,3-naphthalene dicarboxylic acid.

15. The process as set forth in claim 10, further characterized in that said imide comprises N-[3,6-bis-(2-hydroxyethyl) - 7 - methyl - 3,6 - diazatridecyl] - 5,6,7,8,9,9-hexachloro - 1,2,3,4,4a,5,8,8a - octahydro - 5,8 - methano-2,3-naphthalene dicarboxylic acid.

16. The process as set forth in claim 10, further characterized in that said imide comprises N-[4,8-bis-(2-hydroxyethyl) - 9 - methyl - 4,8 - diazaundecyl]-5,6,7,8,9,9-hexachloro - 1,2,3,4,4a,5,8,8a-octahydro - 5,8 - methano-2,3-naphthalene dicarboxylic acid.

References Cited
UNITED STATES PATENTS
3,371,097   2/1968   Cyba.

WILLIAM H. SHORT, Primary Examiner

T. PERTILLA, Assistant Examiner

U.S. Cl. X.R.
117—136, 138.5, 161; 260—75, 77.5, 2.5, 78